United States Patent
Miyagawa et al.

(10) Patent No.: US 8,028,575 B2
(45) Date of Patent: Oct. 4, 2011

(54) LIQUID LEVEL DETECTING DEVICE

(75) Inventors: Isao Miyagawa, Kariya (JP); Atsushi Yasuda, Anjo (JP)

(73) Assignee: Denso Corporation, Kariya (JP)

( * ) Notice: Subject to any disclaimer, the term of this patent is extended or adjusted under 35 U.S.C. 154(b) by 723 days.

(21) Appl. No.: 12/071,442

(22) Filed: Feb. 21, 2008

(65) Prior Publication Data

US 2008/0231267 A1   Sep. 25, 2008

(30) Foreign Application Priority Data

Mar. 20, 2007   (JP) .................................. 2007-73319

(51) Int. Cl.
  *G01F 23/00* (2006.01)
(52) U.S. Cl. .......................................................... 73/313
(58) Field of Classification Search ........................ 73/313
  See application file for complete search history.

(56) References Cited

U.S. PATENT DOCUMENTS

| 3,857,004 A * | 12/1974 | Kavthekar et al. ........... 200/84 C |
| 6,267,416 B1 * | 7/2001 | Ferreira et al. ............... 285/319 |
| 2003/0035744 A1 * | 2/2003 | Horita et al. .................. 417/460 |
| 2005/0083045 A1 * | 4/2005 | Miyagawa ............... 324/207.25 |

FOREIGN PATENT DOCUMENTS

| JP | 11-094631 | 4/1999 |
| JP | A-2001-317985 | 11/2001 |
| JP | A-2003-172652 | 6/2003 |
| JP | 2005-10093 | 1/2005 |

OTHER PUBLICATIONS

Chinese Office Action dated May 19, 2010, issued in corresponding Chinese Application No. 200810086563.1, with English translation.
Chinese Office Action dated Aug. 14, 2009, issued in corresponding Chinese Application No. 200810086563.1, with English translation.
Japanese Office Action dated Oct. 14, 2008 issued in corresponding Japanese Application No. 2007-073319 with English translation.

* cited by examiner

*Primary Examiner* — Hezron E Williams
*Assistant Examiner* — Alex Devito
(74) *Attorney, Agent, or Firm* — Nixon & Vanderhye PC (57) ABSTRACT

A liquid level detecting device includes a rotative member having a bearing portion and a stationary member having an axis portion. The axis portion is fitted to a hole of the bearing portion, thereby rotatably holding the rotative member. The rotative member is integrated with a displacement member. The stationary member is fixed with a detection unit to detect a displacement of the displacement member. The rotative member is connected with a float via an arm. The axis portion has an inserted portion inserted in the bearing portion and in contact with the bearing portion via a contact portion. The contact portion has a total area that is less than an area of an outer circumferential periphery of the inserted portion.

2 Claims, 5 Drawing Sheets

LIQUID LEVEL DETECTING DEVICE

CROSS REFERENCE TO RELATED APPLICATIONS

This application is based on and incorporates herein by reference Japanese Patent Application No. 2007-73319 filed on Mar. 20, 2007.

FIELD OF THE INVENTION

The present invention relates to a liquid level detecting device for detecting a liquid level.

BACKGROUND OF THE INVENTION

For example, according to US2005/0083045A1 (JP-A-2005-10093), a liquid level detecting device includes a float, which floats in fluid to detect a liquid level of the fluid. The float is connected with one end of an arm. The arm is rotatably supported by a body at the other end. The other end of the arm is fixed with a magnet. The body has a magnetoresistive element as a magnetism detection element opposed to the magnet. The float moves correspondingly to change in a liquid level, so that the movement of the float is converted into a rotary motion of the arm, thereby the magnet rotates in conjunction with the liquid level. Thus, magnetic flux generated by the magnet rotates, so that the amount of the magnetic flux, which passes through a magnetoresistive element changes. The liquid level detecting device detects the liquid level in accordance with a signal level output from the magnetoresistive element, the signal level changing correspondingly to the change in the magnetic flux.

In the present structure, the magnet is fixed to a magnet holder. The body has an axis portion fitted to a hole of the magnet holder, so that the magnet holder is rotatable around the axis portion as a rotation axis relative to the body. That is, the hole of the magnet holder and the axis portion of the body construct a slide bearing and a slide axis.

In the present structure of the liquid level detecting device, the magnet holder and the body are immersed in fluid when the liquid level is high. In this condition, fluid infiltrates into a gap in a fitting portion between the magnet holder and the body. When the magnet holder rotates, the fluid infiltrating into the gap exerts frictional force to the fitting portion between the hole of the magnet holder and the axis portion of the body. When the fluid is low-viscosity fluid such as fuel for a motor vehicle, the frictional force is low even in a condition where the fluid infiltrates into the gap in the fitting portion. In this case, the magnet holder rotates promptly to change in the liquid level. Namely, the liquid level detecting device is quick in response to change in the liquid level. By contrast, when the fluid is high-viscosity fluid such as lubricating oil for a motor vehicle, high frictional force is exerted to the fitting portion between the hole of the magnet holder and the axis portion of the body when the magnet holder rotates. Accordingly, the magnet holder hardly rotate promptly to change in the liquid level, and consequently response in the liquid level detection may be impaired.

SUMMARY OF THE INVENTION

In view of the foregoing and other problems, it is an object of the present invention to produce a liquid level detecting device having a rotating component for detecting a liquid level and capable of detecting the liquid level with quick response.

According to one aspect of the present invention, a liquid level detecting device provided to a container for storing fluid, the liquid level detecting device comprises a rotative member including a bearing portion having a hole. The liquid level detecting device further comprises a stationary member having an axis portion fitted to the hole of the bearing portion and rotatably holding the rotative member. The liquid level detecting device further comprises a displacement member fixed to the rotative member and rotative integrally with the rotative member. The liquid level detecting device further comprises a detection unit fixed to the stationary member and configured to detect a position of the displacement member so as to detect a liquid level of the fluid in the container. The liquid level detecting device further comprises a float configured to float in the fluid. The liquid level detecting device further comprises an arm fixed to the float at one end and fixed to the rotative member at an other end, the arm being configured to convert a vertical motion of the float to a rotary motion of the rotative member. The axis portion has an inserted portion inserted in the bearing portion. The inserted portion is in contact with the bearing portion via a contact portion. The contact portion has a total area that is less than an area of an outer circumferential periphery of the inserted portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
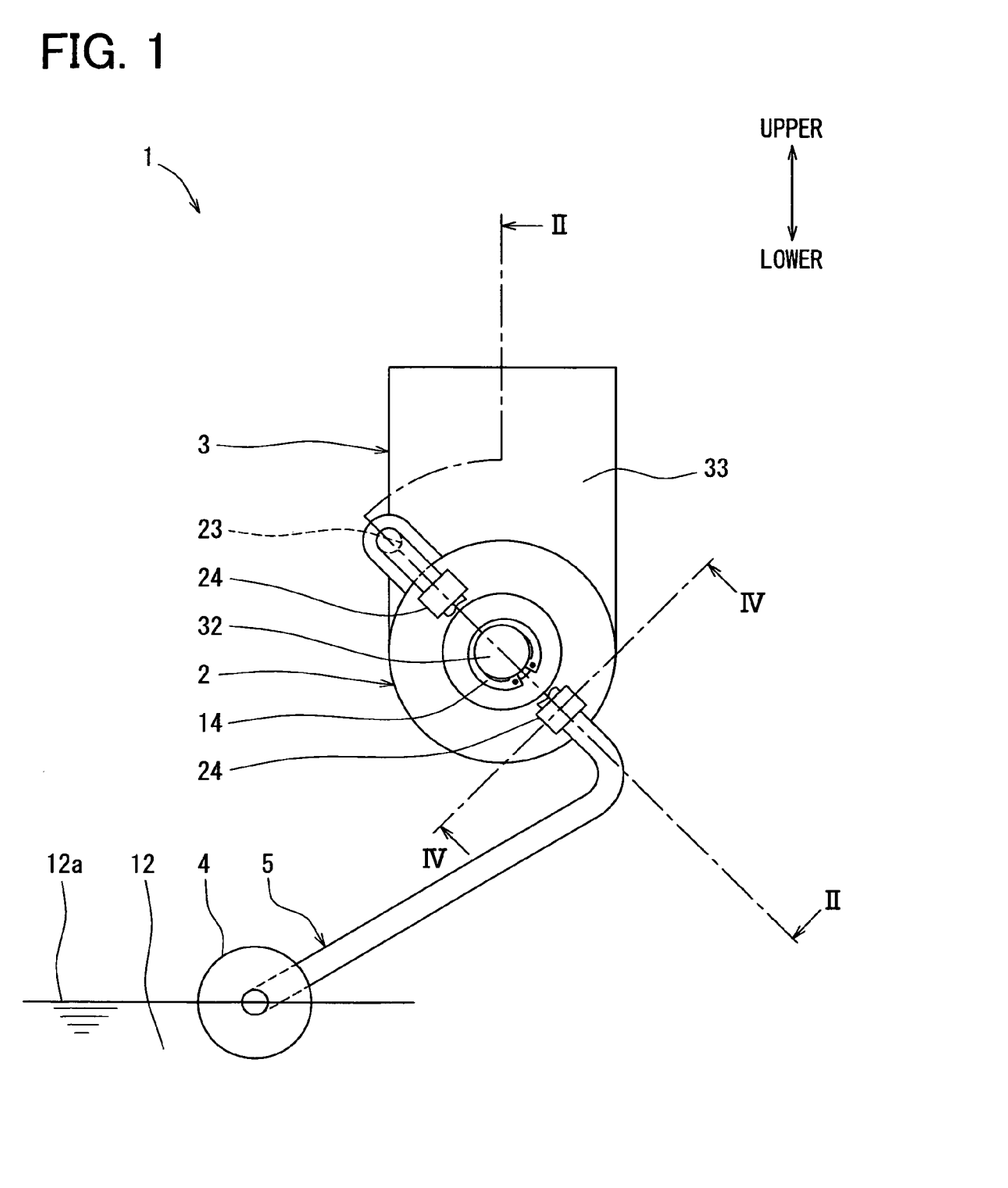
FIG. 1 is a front view showing a lubricating oil level gauge according to a first embodiment.
Figure 6:
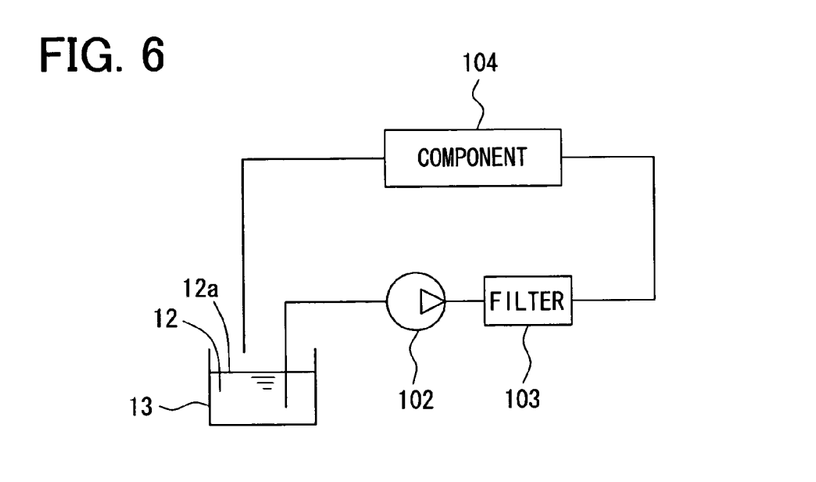
FIG. 6 is a schematic view showing a lubricating oil circuit provided with the lubricating oil level gauge according to the first embodiment.

As shown in FIGS. 1, 6, a lubricating oil level gauge 1 as a liquid level detecting device is provided to an oil sump 13 (FIG. 6) to detect a liquid level of the oil sump 13. The oil sump 13 is a container of fluid such as lubricating oil.

First, a lubricating oil circuit of an engine of the vehicle is described. As shown in FIG. 6, the lubricating oil circuit of the engine includes the oil sump 13, an oil pump 102, an oil filter 103, and movable components 104 of the engine, which are connected with each other via a pipe member, a lubricating oil passage provided in a main body of the engine, and the like.

The oil pump 102 feeds lubricating oil from the oil sump 13 to the oil filter 103. The lubricating oil is removed of a foreign matter or the like by passing through the oil filter 103. Thereafter, the lubricating oil is supplied to each of the movable components 104. The movable components 104 include, for example, a camshaft, a bearing of the crankshaft, a sliding portion between a piston and a cylinder, and an engagement portion such as a gear train. The lubricating oil is brought together into the oil sump 13 after passing through the movable components 104 and lubricating the movable components 104. The lubricating oil is again fed from the oil sump 13 by the oil pump 102. Lubricating oil is sent to the sliding portion between the piston and the cylinder, and is burned together with fuel. Hence, the lubricating oil is gradually consumed in a combustion stroke of the engine. Thus, an amount of lubricating oil passing through the engine and stored in the oil sump 13 gradually decreases. The lubricating oil level gauge 1 measures an amount of lubricating oil in the oil sump 13 by detecting the liquid level of the oil sump 13. When the amount of lubricating oil in the oil sump 13, which is detected by the lubricating oil level gauge 1, becomes less than a predetermined quantity, an alarm is raised, for example, so as to urge an occupant to supply or exchange lubricating oil.

Figure 2:
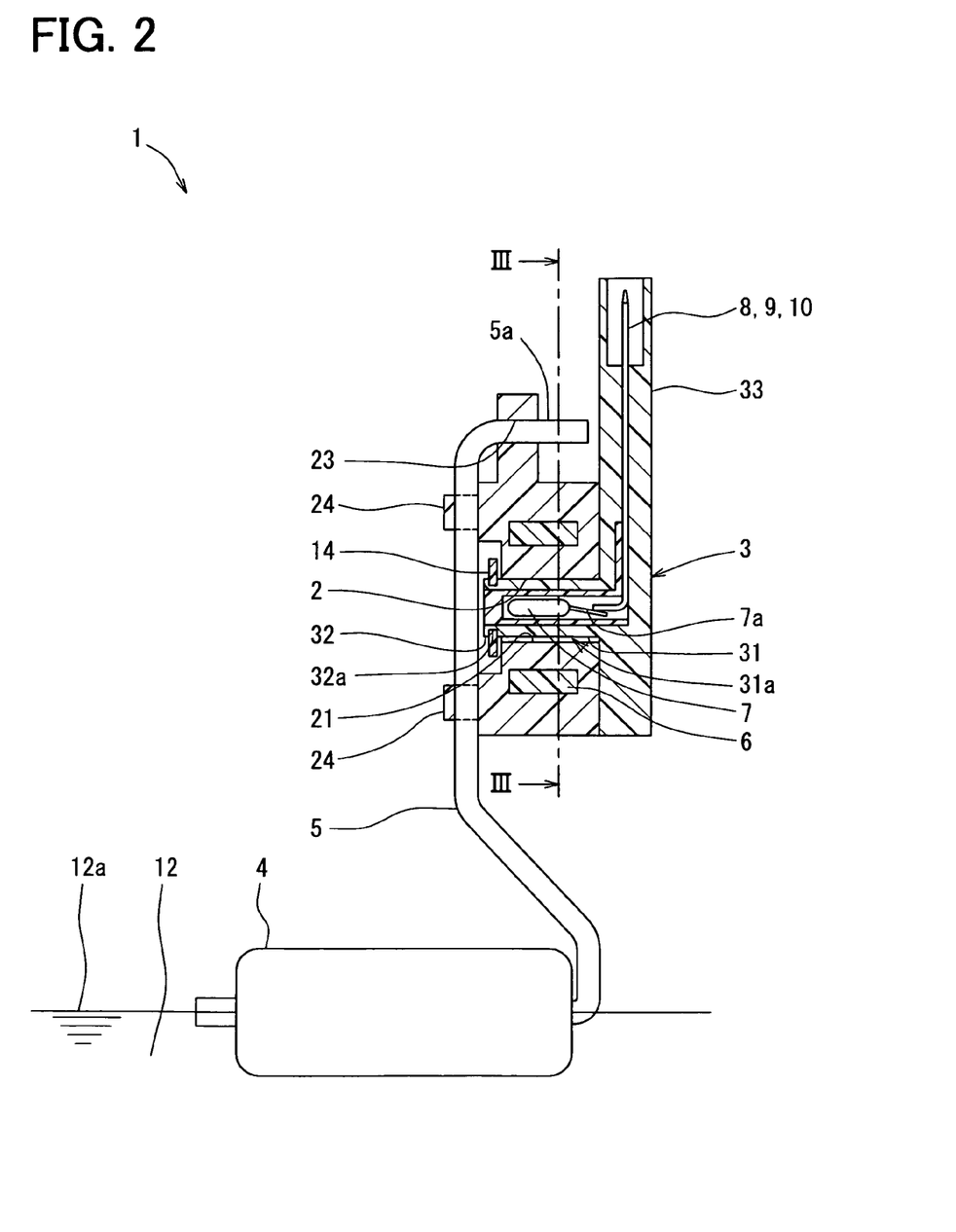
FIG. 2 is a sectional view taken along a line II-II in FIG. 1.
Figure 3:
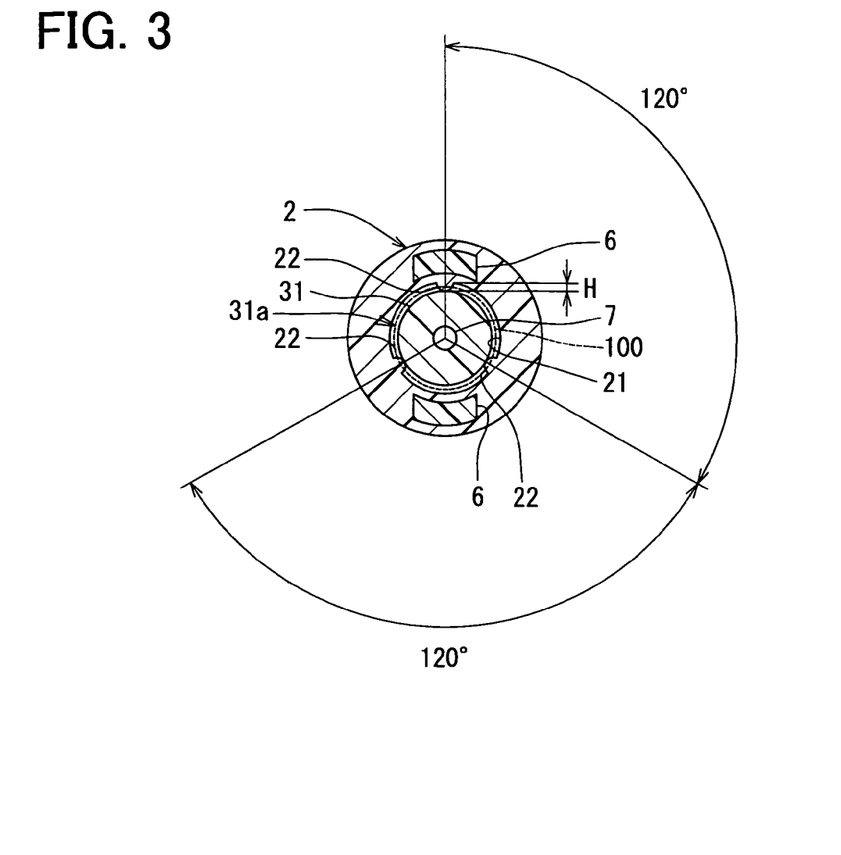
FIG. 3 is a sectional view taken along a line III-III in FIG. 2.

Below, the structure of the lubricating oil level gauge 1 according to the present embodiment is described. A magnet holder 2 as a rotative member is formed of a resin material, for example. As shown in FIG. 2, permanent magnets 6 as displacement members are fixed to the magnet holder 2. The magnet holder 2 has a hole portion 21 as a bearing portion. The hole portion 21 is fitted with an axis portion 31 of a body 3 as a body portion. The hole portion 21 has a through hole in a circular shape in cross section. The hole portion 21 has an inner periphery, which defines the hole portion 21, and the inner periphery is provided with multiple protrusions 22. In the present embodiment, the inner periphery of the hole portion 21 is provided with three protrusions 22. As shown in FIG. 3, each of the protrusions 22 is in a round shape in cross section when the cross section is taken perpendicularly to the axial direction of the hole portion 21. Each protrusion 22 is, for example, substantially in a dike shape and extends substantially in parallel with the axial direction of the hole portion 21. As shown in FIG. 3, the three protrusions 22 are provided at regular intervals, i.e., at 120 degrees of intervals in the circumferential direction of the hole portion 21. The three protrusions 22 thereamong define an inscribed circle having a diameter, which is slightly greater than the diameter of the axis portion 31. In FIG. 3, the inscribed circle of the three protrusions 22 and the axis portion 31 substantially overlap one another. That is, the inscribed circle of the three protrusions 22 is substantially congruent with the cross section of the axis portion 31.

Figure 5:
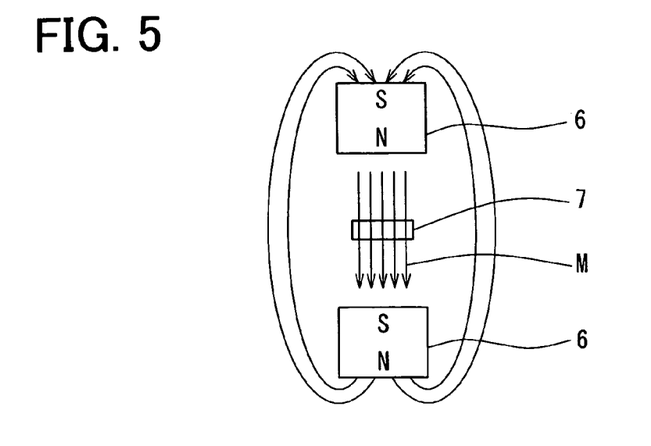
FIG. 5 is a schematic view showing magnets of the lubricating oil level gauge and a magnetic flux generated by the magnets according to the first embodiment.

Each of the three protrusions 22 has substantially the same height H with respect to the radial direction of the hole portion 21. In the present structure, the inscribed circle of the three protrusions 22 and the hole portion 21 are substantially concentric with each other. Each of the magnets 6 is, for example formed of a ferrite magnet or a rare earth magnet. Two of the magnets 6 are attached to the magnet holder 2 in a physical relationship shown in FIG. 3, in which the two magnets 6 are located on both sides of the hole portion 21 in a manner of axial symmetry. As shown in FIG. 5, the two magnets 6 therebetween generate a magnetic flux M from N-poles to S poles. The two magnets 6 are located on both sides of the hole portion 21 in such a manner of axial symmetry. The two magnets 6 therebetween generate inner magnetic flux M passing in the radial direction of the hole portion 21. The center of the inner magnetic flux M passes through the center of the hole portion 21, i.e., the center of the rotation axis of the magnet holder 2. In the lubricating oil level gauge 1 according to the present embodiment, the magnets 6 are Insert-molded of resin together with the magnet holder 2, thereby integrated with the magnet holder 2.

As follows, arrangement of the protrusions 22 is described. The three protrusions 22 are located on the common circle, i.e., located on the inner circumference of the hole portion 21. When an angle between two of the protrusions 22 adjacent to each other is equal to or greater than 180 degrees, the center of the hole portion 21 is located outside a triangle defined among vertexes of the three protrusions 22. Accordingly, the center of the axis portion 31 may not necessarily coincide with the center of the hole portion 21. In other words, the position of the axis portion 31 may not be determined uniquely with respect to the three protrusions 22. Consequently, the axis portion 31 and the magnet holder 2 may therebetween define a large gap. Accordingly, the position of the rotation center of the magnet holder 2 becomes unstable, and consequently the liquid level may not be accurately detected.

By contrast, in the lubricating oil level gauge 1 according to the present embodiment, two of the three protrusions 22, which are adjacent to each other, are provided substantially at 120-degree intervals. That is, two of the three protrusions 22, which are adjacent to each other, are provided at angular intervals each being less than 180 degrees. In the present structure, the center of the hole portion 21 is located inside the triangle defined among the vertexes of the three protrusions 22, so that the center of the axis portion 31 coincides with the center of the hole portion 21. Therefore, the position of the axis portion 31 is determined uniquely with respect to the three protrusions 22, so that the gap between the axis portion 31 and the three protrusions 22 are determined substantially at minimum needed for maintaining smooth rotation of the axis portion 31. Thus, the liquid level can be accurately detected. Here, in order to support a circle steadily on an outer circumference of the circle, at least three supporting points are needed. Therefore, in the present embodiment, the three protrusions 22 are provided in the lubricating oil level gauge 1. The number of the protrusions 22 is not limited to three and may be greater than three.

Figure 4:
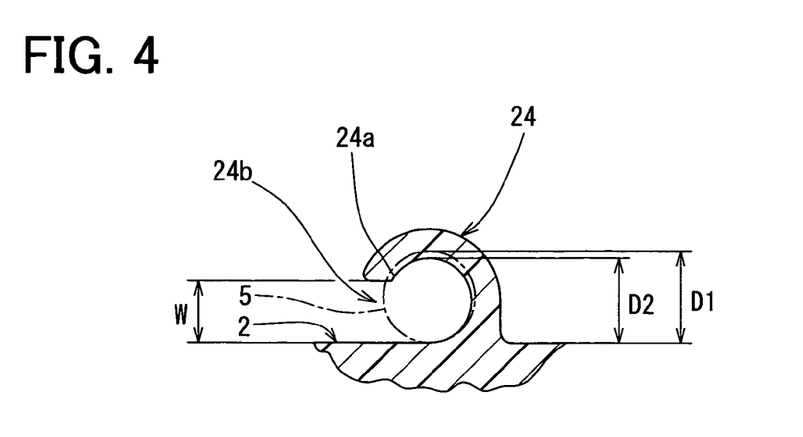
FIG. 4 is a sectional view taken along a line IV-IV in FIG. 1.

As shown in FIG. 2, the magnet holder 2 is provided with holding portions 24 for holding an arm 5. Referring to FIGS. 1, 2, two of the holding portions 24 are provided on an end surface of the magnet holder 2 on the opposite side of the body 3. The two holding portions 24 are located on both sides of the hole portion 21. As shown in FIGS. 1, 2, 4, each of the holding portions 24 includes a support portion 24a and has an opening 24b. The arm 5 is fixed to the support portion 24a by being inserted through the opening 24b, thereby being attached to the holding portions 24. In FIG. 4, the holding portions 24 are not attached with the arm 5, and the arm 5 as an imaginary component is depicted by a dashed dotted line. In FIG. 4, the support portion 24a is substantially in a circular shape in cross section. The support portion 24a has a diameter D2, which is less than a diameter D1 of the arm 5. In FIG. 4, the opening 24b has a width W perpendicularly to the axial direction of the holding portions 24, and the width W is less than the diameter D2 of the support portion 24a. When the arm 5 is equipped to the support portion 24a, the arm 5 is pushed from the left side in FIG. 5 into the opening 24b of each of the holding portions 24, so that the holding portions 24 are elastically deformed. Thus, the holding portions 24 are equipped with the arm 5 through the opening 24b, so that the arm 5 is fixed to the support portion 24a. In the present condition, the holding portions 24 are elastically deformed, so that the arm 5 is resiliently held by the holding portions 24. Two holding portions 24 are respectively coaxial with the support portions 24a. The support portions 24a have a common center axis, and the common center axis intersects with a center axis of a stationary hole 23, into which a stopper 5a of the arm 5 is fitted. With the present structure of the support portions 24a, the arm 5 can be easily and steadily attached to the magnet holder 2.

As shown in FIG. 2, the magnet holder 2 has the stationary hole 23. The magnet holder 2 is fitted to the stopper 5a of the arm 5 via the stationary hole 23. Referring to FIG. 2, the stationary hole 23 is in parallel with the hole portion 21 of the magnet holder 2. The diameter of the stationary hole 23 is the same as the diameter D1 of the arm 5 or slightly smaller than the diameter D1. In the present structure, a worker is capable of easily inserting the arm 5 to the stationary hole 23 so as to attach the arm 5 to the magnet holder 2 to construct the lubricating oil level gauge 1. In addition, the arm 5 is interference-fitted to the stationary hole 23 such that the arm 5 is rotatable relative to the magnet holder 2.

The body 3 as a stationary member has the hole portion 21 and the axis portion 31. The axis portion 31 is fitted to the hole portion 21 as a bearing portion of the magnet holder 2. The body 3 is formed of a resin material, for example. The body 3 includes the axis portion 31 and a base portion 33. The base portion 33 holds one end of the axis portion 31. Referring to FIG. 2, the axis portion 31 is in a cylindrical shape. The axis portion 31 is fitted to the hole portion 21 of the magnet holder 2, so that the inscribed circle defined by the three protrusions 22 determines the position of the axis portion 31. In the present structure, the body 3 rotatably holds the magnet holder 2. Referring to FIG. 2, the axis portion 31 has a small diameter portion 32 at a tip end. The small diameter portion 32 is smaller than the axis portion 31 in diameter and is coaxial with the axis portion 31. Referring to FIG. 2, a slot 32a is provided in the small diameter portion 32. The present slot 32a is equipped with a snap ring 14. The protrusions 22 of the hole portion 21 of the magnet holder 2 define an imaginary inscribed circle pipe into which the axis portion 31 is fitted. The small diameter portion 32 is equipped with the snap ring 14 in a condition where the axis portion 31 is fitted to the hole portion 21, so that the snap ring 14 regulates an axial movement of the magnet holder 2 with respect to the left side in FIG. 2. That is, the snap ring 14 regulates the axial movement of the magnet holder 2 such that the magnet holder 2 is not pulled out of the body 3.

Referring to FIG. 2, the axis portion 31 of the body 3 accommodates a hall element 7. The hall element 7 as a magnetism detection element detects a displacement of the magnets (displacement member) 6. In FIG. 2, the hall element 7 is arranged such that an overlap length, in which the hall element 7 and the magnets 6 overlap one another, is possibly large along a center-axis of the axis portion 31 with respect to an axial direction of the axis portion 31. In the present structure, the inner magnetic flux M passes between the two magnets 6 to regularly pass through the hall element 7 while the magnet holder 2 rotates around a circumference of the axis portion 31. Thus, the magnetic flux M of the magnets 6 effectively crosses through the hall element 7. In the present structure, an output voltage of the hall element 7 can be enhanced, thereby a liquid level 12a can be further accurately detected. Referring to FIG. 2, the hall element 7 has lead portions 7a respectively connected with terminals 8, 9, 10. Each of the terminals 8, 9, 10 is made of a metal plate. A tip end of each of the terminals 8, 9, 10 is extended outside an end of the base portion 33 of the body 3 so as to electrically connect the hall element 7 with an external electric circuit and a battery.

As follows, an operation of the hall element 7 is described. The hall element 7 is made of a semiconductor. The hall element 7 generates hall voltage in a condition where the hall element 7 is applied with voltage when a magnetic field is exerted from an exterior of the hall element 7. The hole voltage is proportional to a density of the magnetic flux, which passes through the hall element 7. In the present structure, when the magnetic flux M perpendicularly passes through the hall element 7, the density of the magnetic flux in the hall element 7 is the maximum, and the hall element 7 generates the highest hall voltage. By contrast, when the magnetic flux M passes in parallel with the hall element 7, the density of the magnetic flux in the hall element 7 is minimum, and the hall element 7 generates the lowest hall voltage.

In the lubricating oil level gauge 1 according to the present embodiment, the magnet holder 2 rotates corresponding to change in the liquid level 12a, so that the angle between the magnetic flux M of the magnets 6 and the hall element 7 changes. Thus, the hall voltage as the output voltage of the hall element 7 changes in conjunction with the change in the angle between the magnetic flux M and the hall element 7. Therefore, the rotation angle of the magnet holder 2 can be measured by detecting the hall voltage of the hall element 7, thereby the liquid level 12a can be measured.

The body 3 includes three terminals 8, 9, 10 in order to electrically connect the hall element 7 with the external electric circuit and the battery. Specifically, the three terminals 8, 9, 10 include a battery terminal 8, a grand terminal 9, and a signal terminal 10. The battery terminal 8 is connected with a positive electrode of the battery. The grand terminal 9 is connected with a negative electrode of the battery. The signal terminal 10 is provided for transmitting the detection signal of the hall element 7 to the external circuit. Each of the terminals 8, 9, 10 is made of a conductive metal plate such as a phosphorus bronze plate or a brass plate. Referring to FIG. 2, each of the terminals 8, 9, 10 is electrically connected with each of the lead portions 7a of the hall element 7 at one end. Specifically, each of the terminals 8, 9, 10 is electrically coupled by crimping, fusing, or the like. As shown in FIG. 1, each of the terminals 8, 9, 10 is electrically connected with an electric wire 15 at the other end. Each of the terminals 8, 9, 10 is electrically coupled also by crimping, fusing, or the like. Each electric wire 15 is pulled out of the oil sump 13 and is electrically connected with the external electric circuit and the battery.

The arm 5 is made of a round bar formed of a metallic material such as stainless steel. As shown in FIG. 1, the arm 5 is connected with a float 4 at one end. The arm 5 is fixed to the magnet holder 2 at the other end. The float 4 is configured to float in a lubricating oil 12. The float 4 vertically moves correspondingly to a change in the liquid level 12a. The arm 5 is configured to convert the vertical motion of the float 4 into a rotary motion of the magnet holder 2. As shown in FIG. 2, the arm 5 has an end on the opposite side of the float 4, and the end of the arm 5 is bent substantially at a right angle toward the body 3 to define the stopper 5a. The stopper 5a is in parallel with the rotation axis of the magnet holder 2. That is, the stopper 5a is in parallel with a center axis C of the hole portion 21. The stopper 5a is fitted to the stationary hole 23 of the magnet holder 2, so that the arm 5 is fixed to the magnet holder 2.

The float 4 is formed of a material, which is excellent in oil resistance and heat resistance. The float 4 is formed of resin, for example. Apparent specific gravity of the float 4 is determined such that the float 4 steadily floats in the liquid level 12a of lubricating oil when the float 4 is attached to the arm 5. When the float 4 moves up and down according to change in the liquid level 12a, the motion of the float 4 is transmitted to the magnet holder 2 via the arm 5, so that the magnet holder 2 rotates relative to the body 3.

The body 3 as the stationary member is formed of resin, for example. Referring to FIG. 2, the body 3 includes the axis portion 31. The hole portion 21 of the magnet holder 2 is fitted to an outer periphery of the axis portion 31, so that the magnet holder 2 is rotatably held. Referring to FIG. 2, the axis portion 31 is fitted to the hole portion 21 of the magnet holder 2. The small diameter portion 32 extends from the tip end of the axis portion 31. The small diameter portion 32 is smaller than the axis portion 31 in diameter. The slot 32a is provided to the small diameter portion 32. The slot 32a is provided with the snap ring 14. The magnet holder 2 has a regulating portion, which makes contact with the snap ring 14, thereby regulating the axial movement of the magnet holder 2 with respect to the left side in FIG. 2. That is, the regulating portion of the magnet holder 2 regulates the axial movement of the magnet holder 2 such that the magnet holder 2 is not pulled out of the body 3.

The axis portion 31 of the body 3 accommodates the hall element 7. The hall element 7 as the magnetism detection element (detection unit) detects the displacement of the magnet as the displacement member. In FIG. 2, the hall element 7 inside the magnets 6 is arranged such that the overlap length with the magnets 6 is possibly large with respect to the axial direction of the axis portion 31. In the present structure, the magnetic flux M, which is generated between the magnets 6 to pass through the hall element 7, can be enhanced, thereby the output voltage of the hall element 7 can be also enhanced. Thus, the liquid level 12a can be further accurately detected. The hall element 7 includes the lead portions 7a that electrically connect the hall element 7 with the external electric circuit and the battery. In particular, the lead portions 7a connects the hall element 7 with the positive and negative electrodes of the power supply, thereby the hall element 7 is supplied with electric power and operated. The lead portions 7a further lead the detection signal output from the hall element 7. The body 3 includes a pair of stoppers (not shown) for regulating the rotation angle of the magnet holder 2.

As follows, an operation of the hall element 7 is described. The hall element 7 is made of a semiconductor. The hall element 7 generates the hall voltage in a condition where the hall element 7 is applied with voltage when a magnetic field is exerted from an exterior of the hall element 7. The hole voltage is substantially in proportion to the density of the magnetic flux, which passes through the hall element 7. When the magnetic flux M crosses perpendicularly through the hall element 7, the magnetic flux density in the hall element 7 is the maximum, so that the hall element 7 generates the highest hall voltage. When the magnetic flux M is in parallel with the hall element 7, the magnetic flux density in the hall element 7 is the minimum, so that the hall element 7 generates the lowest hall voltage.

In the lubricating oil level gauge 1 according to the present embodiment, as the magnet holder 2 rotates correspondingly to the change in the liquid level 12a, the angle between the magnetic flux M of the magnets 6 and the hall element 7 changes. Thus, the hall voltage as the output voltage of the hall element 7 changes in connection with the change in the angle between the magnetic flux M and the hall element 7. Therefore, the liquid level 12a, which correlates with the rotation angle of the magnet holder 2, can be measured by detecting the hall voltage.

Next, the structure and of an operation effect of the fitted portion between the magnet holder 2 and the body 3 in the lubricating oil level gauge 1 are described.

In a conventional liquid level detecting device, a cylindrical axis portion of a body is fitted into a bearing hole portion of a magnet holder. Specifically, an inner periphery of the bearing hole portion of the magnet holder is opposed to an outer circumferential periphery of the axis portion via a predetermined gap, and the gap is filled with fluid, which is an object of the liquid level detection. In this conventional structure of the liquid level detecting device, the magnet holder is fitted to the body to construct therebetween a slide bearing structure. In the present slide bearing structure, the fluid exists in the contact portion between the magnet holder having the bearing hole portion and the axis portion of the body. That is, the fluid exists in the contact portion defining a minimum gap needed for rotatably supporting the axis portion of the body. The fluid having viscosity exerts frictional force to produce resistance against rotation of the magnet holder. The resistance correlates with the contact area in the contact portion and the viscosity of the fluid. As the contact area in the contact portion becomes large, the resistance becomes large. As the viscosity of the fluid becomes high, the resistance also becomes large. In the conventional liquid level detecting device, the contact portion between the magnet holder having the bearing hole portion and the cylindrical axis portion of the body is in a cylindrical shape. That is, the contact portion is in the shape of a cylinder having an axial length in which the bearing hole portion and the axis portion radially overlap one another with respect to the radial direction of the axis portion. When such a conventional liquid level detecting device is applied to low-viscosity fluid such as gasoline and light oil, the magnet holder is rotatable with quick response relative to change in the liquid level. By contrast, when the conventional liquid level detecting device is applied to high-viscosity fluid such as lubricating oil higher than gasoline and light oil in viscosity, the resistance against the rotation of the magnet holder increases. In this case, the magnet holder cannot rotate with quick response relative to change in the liquid level, and consequently accuracy of detection of the liquid level may be impaired.

By contrast, the lubricating oil level gauge 1 according to the present embodiment has the three protrusions 22 in the inner periphery of the hole portion 21 of the magnet holder 2. The tip ends of the protrusions 22 and the axis portion 31 of the body 3 make contact with each other to construct the bearing structure. Thus, when the lubricating oil level gauge 1 is applied to fluid such as lubricating oil having viscosity higher than that of gasoline and light oil, the magnet holder is rotatable with quick response relative to change in the liquid level. In the present structure, each of the protrusions 22 is substantially in a line contact with the axis portion 31. That is, the contact portion defining the minimum gap needed for rotatably supporting the axis portion 31 is in a condition of the line contact. Therefore, a total contact area in the contact portion between the protrusions 22 and the axis portion 31 can be significantly reduced in comparison with the structure of the conventional liquid level detecting device. Thus, the resistance exerted to the contact portion when being rotated can be significantly reduced. In the present structure, the magnet holder 2 can be rotated with quick response relative to change in the liquid level of lubricating oil. Therefore, the lubricating oil level gauge 1 can be significantly enhanced in accuracy when detecting the liquid level.

In the lubricating oil level gauge 1 according to the present embodiment, the hole portion 21 and the axis portion 31 therebetween define the gap filled with lubricating oil as fluid, similarly to the contact portion defined between the protrusions 22 and the axis portion 31 and filled with lubricating oil. However, the gap between the hole portion 21 and the axis portion 31 is much greater than the contact portions between the protrusions 22 and the axis portion 31 in total area. Therefore, the resistance caused by the viscosity of the fluid in the gap between the hole portion 21 and the axis portion 31 is much smaller than the resistance caused by the friction in the contact portion between the protrusions 22 and the axis portion 31. Thus, smooth rotation of the magnet holder 2 can be maintained even though lubricating oil exists in the portions between the hole portion 21 and the axis portion 31 other than the contact portion between the protrusions 22 and the axis portion 31.

In the present embodiment, the axis portion 31 has an inserted portion 31a inserted in the hole portion 21, which is the bearing portion. The inserted portion 31a is in contact with the hole portion 21 via the contact portion between the protrusions 22 and the hole portion 21. The contact portion has a total area that is less than an area of an outer circumferential periphery of the inserted portion 31a.

The inserted portion 31a of the axis portion 31 is inserted in the hole portion 21, and the inserted portion 31a is located in the hole portion 21 via an imaginary cylinder 100a. The inserted portion 31a has an insertion length equal to a cylinder length of the imaginary cylinder 100a with respect to an axial direction of the inserted portion 3a. The inserted portion 31a and the hole portion 21 radially overlap one another. The contact portion between the protrusions 22 and the hole portion 21 has a total area that is less than an area 1b of an outer circumferential periphery of the imaginary cylinder 100a.

Thus, in the present embodiment, smooth rotation of the magnet holder 2 can be maintained even though lubricating oil exists in the portions between the hole portion 21 and the inserted portion 31a other than the contact portion between the protrusions 22 and the inserted portion 31a of the axis portion 31.

(Modification)

In the lubricating oil level gauge 1 according to the present embodiment, the three protrusions 22 provided in the inner periphery of the hole portion 21 of the magnet holder 2 are respectively in the shape of lines extending in parallel with the axial direction of the hole portion 21. Alternatively, the protrusions 22 may be substantially in the shape ring extending in the circumferential direction of the hole portion 21.

Figure 7:
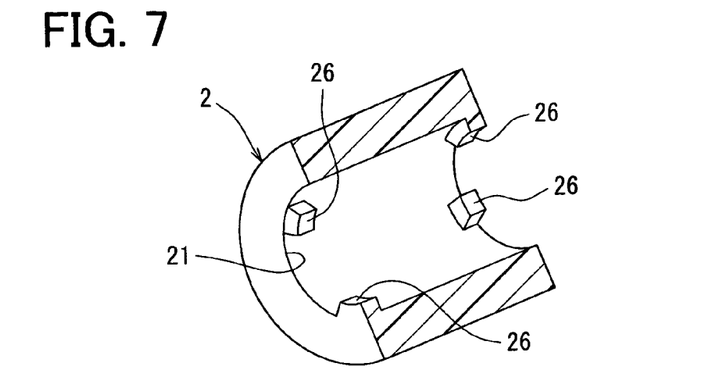
FIG. 7 is a sectional perspective view showing a magnet holder of the lubricating oil level gauge according to a modification.

In the lubricating oil level gauge 1 according to the present embodiment, each of the protrusions 22 is substantially in the shape of the line. Alternatively, as shown in FIG. 7, at least one of the three protrusions 22 may be in the shape of a pointy protrusion 26.

Figure 8:
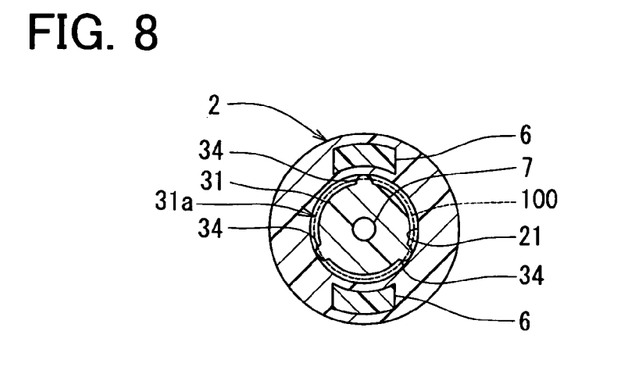
FIG. 8 is a sectional view showing a part of the lubricating oil level gauge according to another modification.
Figure 9:
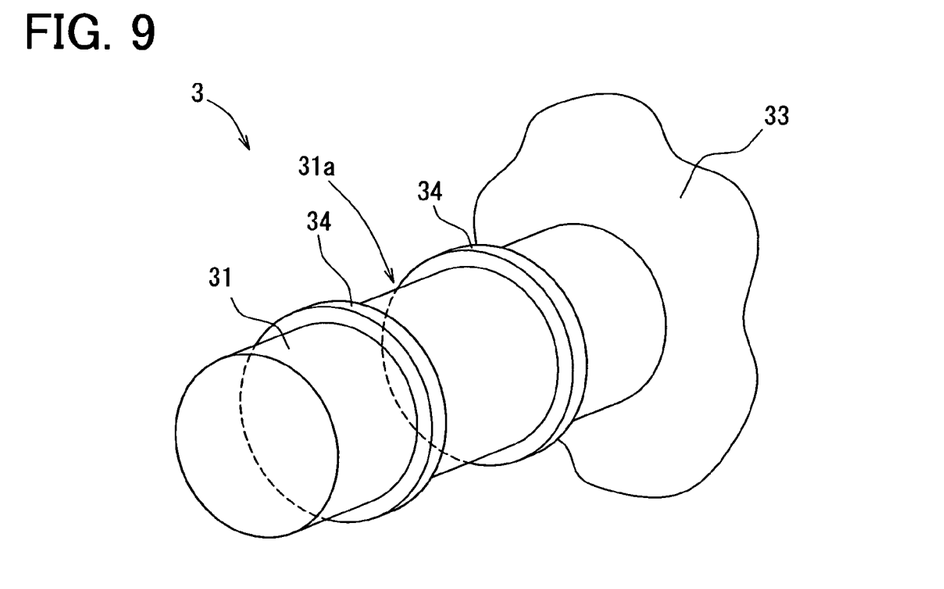
FIG. 9 is a perspective view showing an axis portion of a body of the lubricating oil level gauge according to another modification.

In the lubricating oil level gauge 1 according to the present embodiment, the protrusions 22 are provided to the inner periphery of the hole portion 21 of the magnet holder 2, and the axis portion 31 is in the cylindrical shape. Alternatively, as shown in FIG. 8, linear protrusions 34 may be provided to the outer circumferential periphery of the axis portion 31 of the body 3, such that the linear protrusions 34 extend substantially in parallel with the axial direction of the axis portion 31. In this case, the hole portion 21 of the magnet holder 2 may have a cylindrical inner periphery. In this structure, the member, to which the protrusions are provided, is only changed from the magnet holder 2 into the body 3, and the same effect as that of the lubricating oil level gauge 1 in the first embodiment can be produced. That is, in the present structure, the rotation resistance exerted to the contact portion between the magnet holder 2 and the body 3 is also reduced, so that the magnet holder 2 can be rotated with quick response to change in the liquid level of lubricating oil. Thus, in the present embodiment, the lubricating oil level gauge 1 can be also enhanced in accuracy in detection of the liquid level. In the present embodiment, each of the protrusions 34 is not limited to be extending substantially linearly in parallel with the axial direction of the axis portion 31. As shown in FIG. 9, each of the protrusions 34 may be in a ring shape and extending along the circumferential direction of the axis portion 31. Furthermore, at least one of the protrusions in the linear shape or ring shape may be substituted for a pointy protrusion, and the pointy protrusion may be provide to the outer circumferential periphery of the axis portion 31.

According to the above embodiments, the hall element 7 as the magnetism detection element (detection unit) is provided to the lubricating oil level gauge 1. However, the detection unit is not limited to the hall element 7 and may be another magnetism detection element such as a magnetoresistive element (MRE element) or a magnetism diode.

According to the above embodiments, the hall element 7 has the three terminals 8 via which the hall element 7 is electrically connected with the external electric circuit and the battery. The number of the terminals 8 is not limited to three and may be arbitrary determined.

According to the above embodiments, the liquid level detecting device is applied to the lubricating oil level gauge 1 for a motor vehicle. However, the liquid level detecting device is not limited to be applied to the lubricating oil level gauge 1 for a motor vehicle. The liquid level detecting device in the above embodiments may be provided for detecting a liquid level in a container of a motor vehicle, the container storing fluid such as brake fluid or engine cooling water. Furthermore, the liquid level detecting device in the above embodiments is not limited to be provided to a motor vehicle and may be provided to any other containers for detecting a liquid level.

The number of the permanent magnets 6 may be one.

The above structures of the embodiments can be combined as appropriate. Various modifications and alternations may be diversely made to the above embodiments without departing from the spirit of the present invention.

What is claimed is:

1. A liquid level detecting device provided to a container for storing fluid, the liquid level detecting device comprising:
    a rotative member including a bearing portion having a hole;
    a stationary member having an axis portion fitted to the hole of the bearing portion and rotatably holding the rotative member;
    a displacement member fixed to the rotative member and rotative integrally with the rotative member;
    a detection unit fixed to the stationary member and configured to detect a position of the displacement member so as to detect a liquid level of the fluid in the container;
    a float configured to float in the fluid;
    an arm fixed to the float at one end and fixed to the rotative member at an other end, the arm being configured to convert a vertical motion of the float to a rotary motion of the rotative member,
    wherein the axis portion has an inserted portion inserted in the bearing portion,
    the inserted portion is in contact with the bearing portion via a contact portion, and
    the contact portion has a total area that is less than an area of an outer circumferential periphery of the inserted portion,
    the axis portion has an outer circumferential periphery provided with a plurality of protrusions that provide said contact portion, each of the plurality of protrusions is in the shape of a ring extending in the circumferential direction of the axis portion, and the plurality of protrusions are spaced apart from each other in an axial direction of the axis portion.

2. A liquid level detecting device provided to a container for storing fluid, the liquid level detecting device comprising:

a rotative member including a bearing portion having a hole;

a stationary member having an axis portion fitted to the hole of the bearing portion and rotatably holding the rotative member;

a displacement member fixed to the rotative member and rotative integrally with the rotative member;

a detection unit fixed to the stationary member and configured to detect a position of the displacement member so as to detect a liquid level of the fluid in the container;

a float configured to float in the fluid;

an arm fixed to the float at one end and fixed to the rotative member at an other end, the arm being configured to convert a vertical motion of the float to a rotary motion of the rotative member, wherein the axis portion has an inserted portion inserted in the bearing portion, the inserted portion is in contact with the bearing portion via a contact portion, and the contact portion has a total area that is less than an area of an outer circumferential periphery of the inserted portion, the axis portion has an outer circumferential periphery provided with three protrusions that provide said contact portion, each of the three protrusions extending in an axial direction of the axis portion, and the three protrusions are provided at 120 degree intervals in a circumferential direction of the axis portion.

* * * * *